United States Patent [19]

Janowicz

[11] Patent Number: 4,834,522

[45] Date of Patent: May 30, 1989

[54] OUTSIDE MIRROR FOR MOTOR VEHICLES WITH PROGRAMMER MEANS RESPONSIVE TO STARTING VIEWING ANGLE

[76] Inventor: Miroslaw Janowicz, Schöneberg, Feurigstrasse 46, 1000 Berlin 62, Fed. Rep. of Germany

[21] Appl. No.: 139,150

[22] Filed: Dec. 23, 1987

Related U.S. Application Data

[63] Continuation of Ser. No. 891,110, Jul. 31, 1986, abandoned.

[30] Foreign Application Priority Data

Sep. 19, 1985 [DE] Fed. Rep. of Germany ....... 3533676

[51] Int. Cl.⁴ .......................... B60R 1/06; B60R 1/08; G02B 7/18
[52] U.S. Cl. .................................................. 350/637
[58] Field of Search ................ 350/637, 632; 248/479, 248/486

[56] References Cited

U.S. PATENT DOCUMENTS 4,640,590 2/1987 Wunsch ................................ 350/637

FOREIGN PATENT DOCUMENTS 2036818 1/1972 Fed. Rep. of Germany ...... 350/637

Primary Examiner—Jon W. Henry
Attorney, Agent, or Firm—Krass & Young

[57] ABSTRACT

An outside rear view mirror for vehicles comprising a mirror having adjustment means to adjust it between different rest positions for different driver positions, shift means for temporarily shifting the mirror from a normal viewing angle in its rest position to a wider viewing angle, and programming means to automatically determine the degree of shift of the mirror according to the angle between the mirror in its rest position and the vehicle body.

14 Claims, 4 Drawing Sheets

OUTSIDE MIRROR FOR MOTOR VEHICLES WITH PROGRAMMER MEANS RESPONSIVE TO STARTING VIEWING ANGLE

This is a continuation of co-pending application Ser. No. 891,110 filed on July 31, 1987.

INTRODUCTION

This invention relates to outside rearview mirrors for vehicles more particularly to an outside rearview mirror which, when temporarily shifted to a wider viewing angle position, maintains a critical relation to the original viewing angle positioned irrespective of the distance between the driver and the mirror plane.

BACKGROUND OF THE INVENTION

Shiftable outside rearview mirrors for the purpose of eliminating a blind spot are well-known in the art. The problem with these mirrors is that if they are shifted too far, the driver of the vehicle is left with a new blind spot in an area between the outside edge of the unshifted mirror viewing field and the inside of the shifted mirror viewing field beyond their point of intersection. Thus, an object in this location would be invisible to the driver before and after the shift. A known solution is to regulate the shift of the mirror so that the outside edge of the unshifted mirror viewing field and the inside edge of the shifted mirror viewing field are approximately parallel to each other when the mirror is in its shifted position (German Offenlegungschrift No. 33 41 426). Another problem now arises in that the degree of shift of the mirror which will ensure such a parallel relationship varies according to the angle of the mirror plane relative to the vehicle body, which must be adjusted to accommodate different sizes of drivers. The prior art solutions are only viable for a set angle of the mirror plane relative to the vehicle body, and do not allow for adjustment.

SUMMARY OF THE INVENTION

Accordingly, it is an object of the present invention to provide a shiftable outside rearview mirror with a programming means for changing the degree of mirror shift to accommodate different angles on the mirror plane relative to the vehicle body, which angles may be logically related to the approximate position of the driver.

It is also an object of the present invention to regulate the degree of shift so that the outside edge of the unshifted mirror viewing field and the inside edge of the shifted mirror viewing field maintain a predetermined relationship relative to each other for all degrees of shift.

These and other objects which will become apparent upon a reading of the following specification and claims, are accomplished by way of a shiftable outside rearview mirror means comprising a mirror housing or support on a vehicle and a mirror within the housing shiftable relative to the housing between a rest position and a wider viewing-angle shifted position. Adjustment means are provided for an operator to adjust the rest position angle of the mirror relative to the vehicle body, and control means are provided whereby an operator may temporarily shift the mirror a wider viewing-angle. Moreover, programming means are provided to automatically alter the degree of mirror shift according to the angle of the mirror in its rest position relative to the vehicle body.

In the preferred embodiment, the adjustment means comprise a manually adjustable mirror housing and the programming means comprise a cam mechanism. However, there are many alternatives within the scope of the invention. For example, adjustment means could consist of electrical or mechanical means within a fixed housing to change the mirrors rest position, and programming means could be a microprocessor regulating the control means.

In the most specific preferred embodiment of the invention, the cam-type programming means ensures a substantially parallel relationship between the outside ray of the unshifted mirror viewing field and the inside ray of the shifted mirror viewing field. However, any predetermined relationship between the shifted and unshifted viewing fields could be programmed.

DETAILED DESCRIPTION OF THE PREFERRED EMBODIMENT

In the following specification, specific terminology is utilized in the interest of clarity and a particular embodiment described in accordance with the requirements of 35 USC 112, but it is to be understood that the same is not intended to be limiting, as indeed the invention is capable of many variations within the scope of the appended claims.

Figure 1:
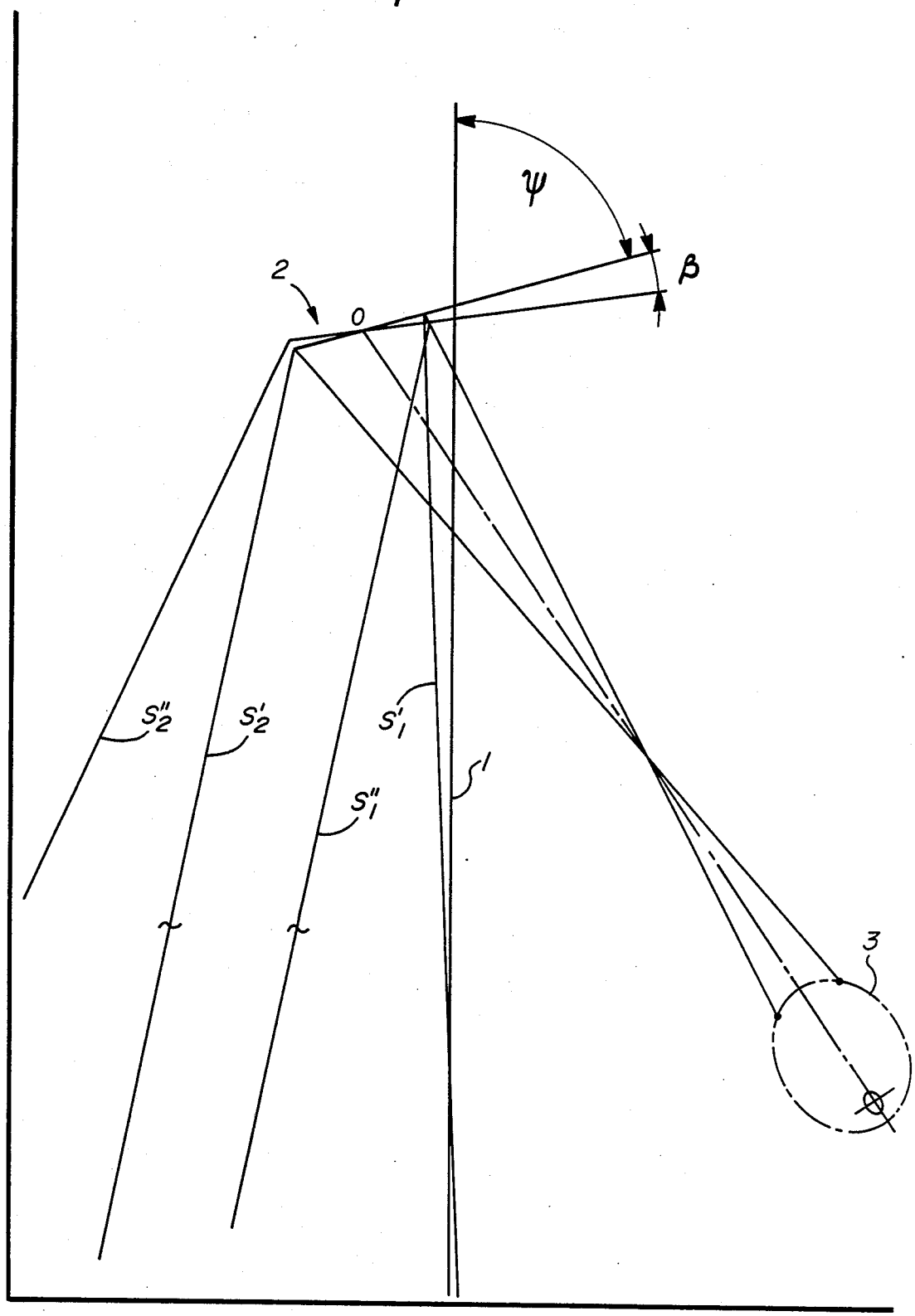
FIG. 1 is a top view of the relationship between the driver's mirror viewing fields in the shifted and unshifted position.

Shown in FIG. 1 are the side of a motor vehicle 1, an outside rearview mirror 2 fastened to the outside of vehicle 1, and the head 3 of a person driving the vehicle 1. In its normal position, mirror 2 forms an angle $\psi$ with the vehicle side 1. Viewing rays representing the edges of the driver's field of vision reflected from mirror 2 in its normal position are shown at $S_1'$ and $S_2'$. Mirror 2 can be shifted by an angle $\beta$ in which case the outside edges of the driver's viewing rays reflected from mirror 2 are shown at $S_1''$ and $S_2''$. As shown in the drawing, $\beta$ is such that $S_1''$ and $S_2'$ are substantially parallel, eliminating the possibility of a blind spot between the mirror's shifted and unshifted positions.

Figure 2:
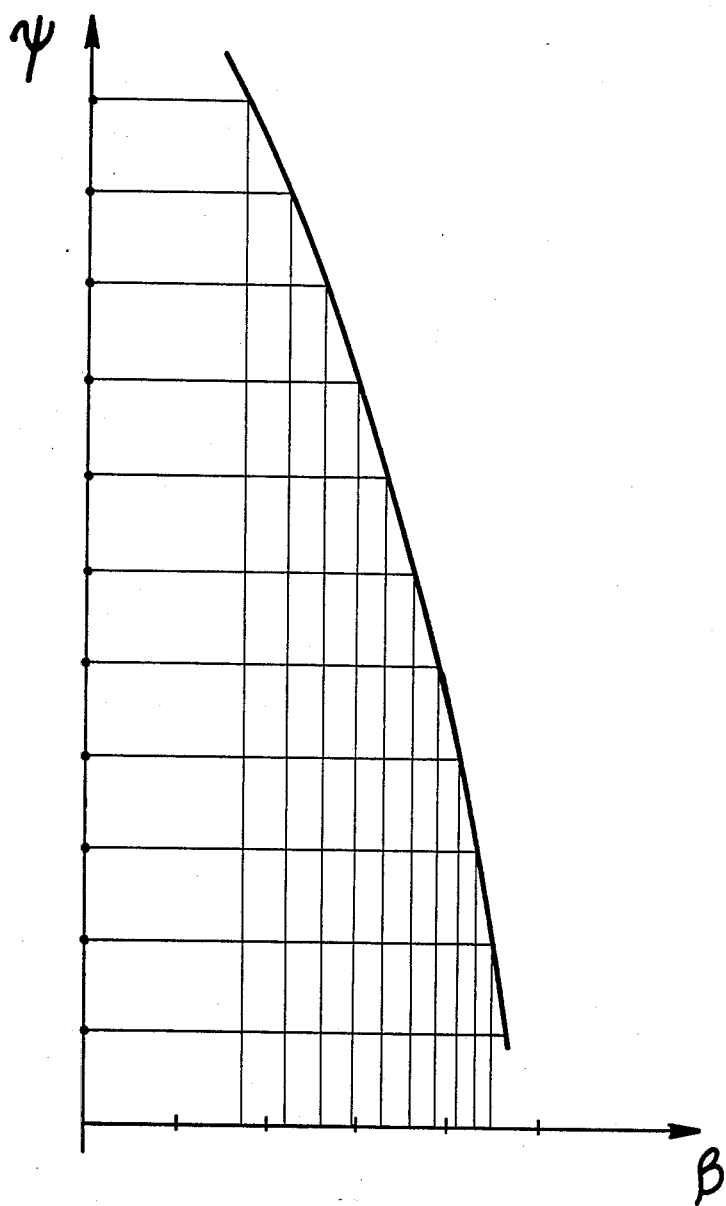
FIG. 2 is a graph showing the relationship about two angles $\psi$ and $\beta$.

FIG. 2 graphically illustrates the relationship of $\psi$ vs. $\beta$. The farther the driver's head 3 is from the mirror 2 in FIG. 1, the greater the angle $\psi$. As $\psi$ becomes larger, degree of shift $\beta$ becomes smaller.

Figure 3:
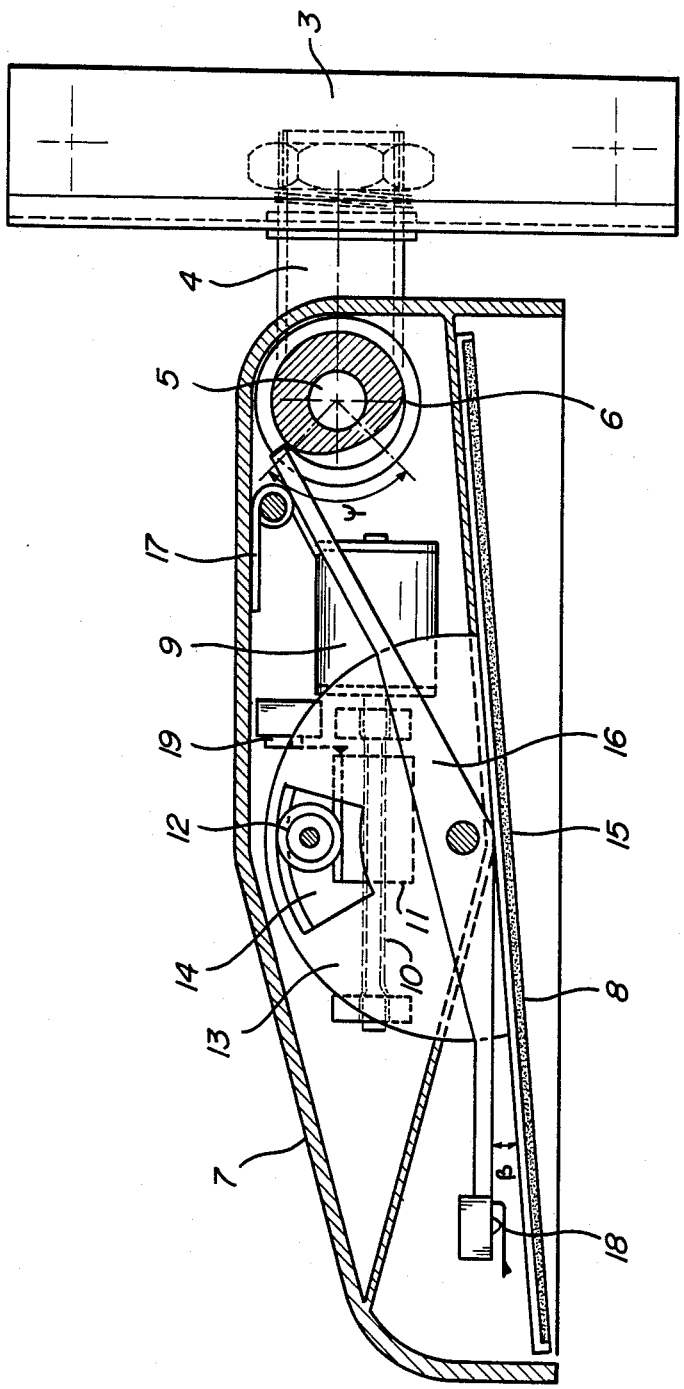
FIG. 3 is a top section view of the mirror according to the present invention.

FIG. 3 illustrates a preferred embodiment of an outside rearview mirror according to the invention. A support bracket 3 is fastened to a motor vehicle. Support arm 4 extends outwardly from bracket 3, with a vertical pin 5 rotatable about its longitudinal axis fastened at the end of arm 4. Fixed to the upper end of pin 5 is a cam plate 6. A mirror housing 7 is also connected to pin 5 in such a manner as to allow it to be swiveled about the longitudinal axis of pin 5. Housing 7 contains control means for shifting mirror 8 within the housing comprising a servo-motor 9 with a screw shaft 10, a block 11 mounted on shaft 10 by way of an internal thread corresponding with screw shaft 10, a geared cylinder 12, and a disk 13 having an aperture 14. Disk 13 is fixed to mirror 8 and the two are rotatably mounted on a shaft 15 fixed to housing 7. Independently and rotatably mounted on shaft 15 is a two-armed lever 16 whose right end is pressed against cam plate 6 by a spring 17, and whose left end has a switch 18 mounted thereon.

If the driver of the vehicle wants to shift mirror 8 within housing 7 from its normal position as shown in FIG. 3, he turns on motor 9 using any suitable driver-operated actuating means (not shown). Motor 9 turns shaft 10, moving block 11 to the left which turns cylinder 12 clockwise. Since cylinder 12 is in geared engagement with disk 13 through aperture 14, disk 13 and mirror 8 are both swiveled clockwise until the left end of mirror 8 travels through angle $\beta$ and contacts switch 18, shutting motor 9 off. Approximately two seconds later, motor 9 is automatically actuated in the reverse direction and mirror 8 is swiveled back to its original position. Block 11 then contacts a switch 19, shutting motor 9 off.

Angle $\beta$ defines the degree of shift of mirror 8, and is determined as follows: when housing 7 is swiveled around the axis of pin 5 in a clockwise direction to accommodate a different driver, lever 16 is swiveled counterclockwise around shaft 15 by cam plate 6. This decreases angle $\beta$ and brings switch 18 closer to the left end of mirror 8 to maintain the parallel relationship between viewing rays $S_2'$ and $S_1''$ of FIG. 1.

The invention can be applied to both left and right outside rearview mirrors. However, the difference between $\beta$ min and $\beta$ max for each mirror will be different.

It is to be understood that the foregoing description is not intended to be limiting, as indeed the invention is capable of many variations within the scope of the apended claims. For example, the movable housing 7 could be replaced by a fixed housing with mirror adjustment means comprising a driver-operated motor inside the housing, and a microprocessor programmer regulating angle $\beta$ in response to mirror adjustment could be substituted for the cam and lever arrangement.

Figure 4:
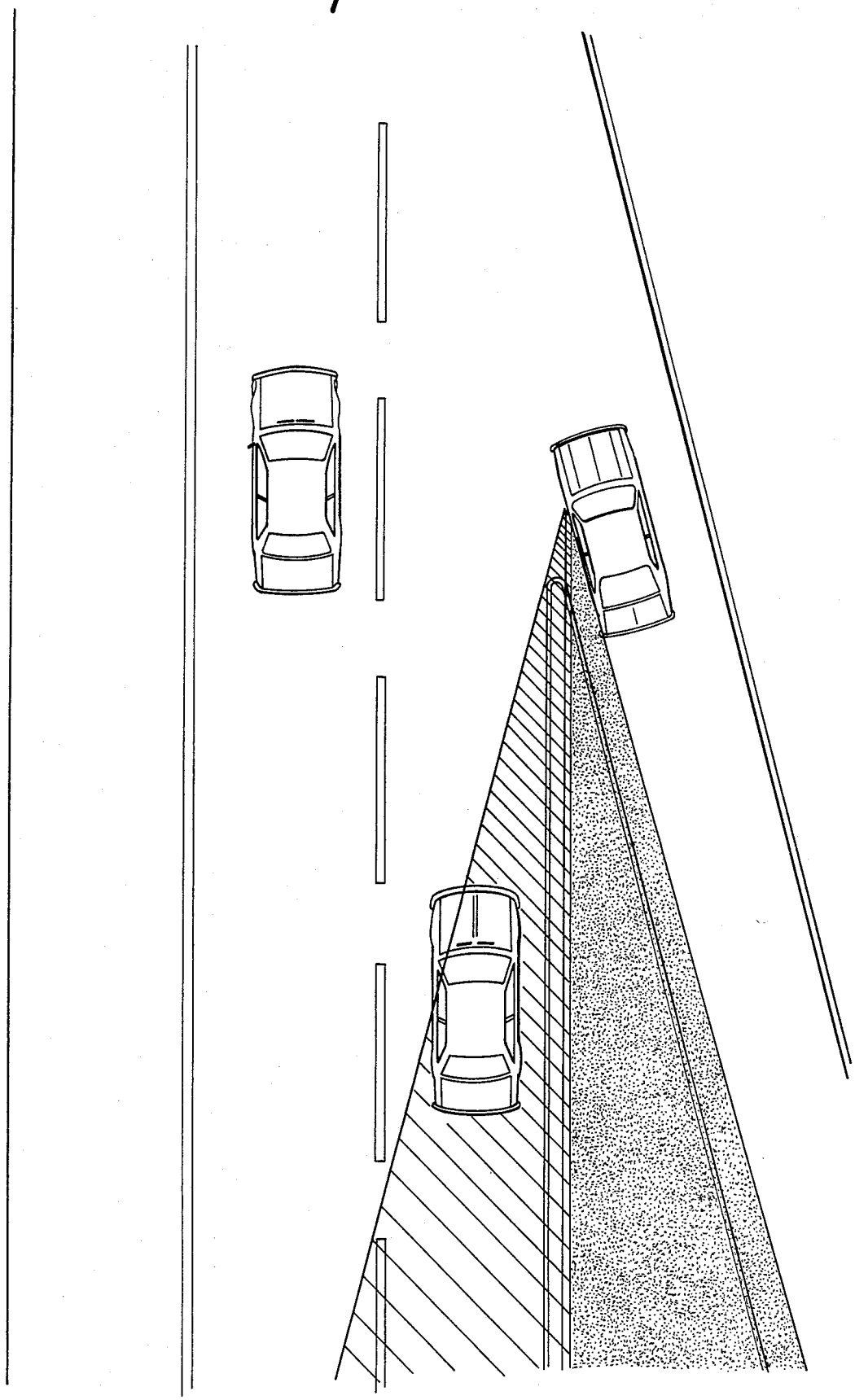
FIG. 4 is an illustration of an actual use of the invention in a driving situation.

FIG. 4 shows how a vehicle entering a roadway from a feeder ramp can utilize the invention to determine the presence of another vehicle in the lane with which the entering vehicle must merge.

OPERATION

It will be assumed that before use of the invention with a vehicle, the mirror housing is turned to the limit of its counterclockwise movement to accommodate a short driver, and that the mirror is in its normal, unshifted position at an angle $\psi$ relative to the vehicle body. Degree of shift $\beta$ is set according to angle $\psi$. If a taller driver gets into the vehicle and sits farther back, he merely turns the mirror housing in a clockwise direction, increasing the angle of the mirror $\psi$ with the vehicle until a satisfactory rear view is obtained. The programming means will have automatically decreased the shift angle $\beta$ to maintain the parallel relationship between the outside edge of the driver's unshifted viewing field and the inside of the driver's shifted viewing field to eliminate possible blind spots.

I claim:

1. An automotive outside rearview mirror apparatus comprising:
   a mirror support adapted to be mounted on the outside of an automotive vehicle;
   a flat mirror mounted on said support and operator-adjustable about a substantially vertical axis to any of a plurality of selected rearviewing angles according to the position of the operator of said vehicle;
   operator-actuable power means for temporarily shifting said mirror about said axis to a viewing angle which is greater than the viewing angle selected by the operator for rearviewing;
   which greater viewing angle provides a viewing field laterally farther outward of the vehicle; and
   programmer means responsive to the operator-selected viewing angle to vary the amount of shift produced by said power means whereby the viewing angle achieved by actuation of said power means is contiguous to the operator-selected viewing field regardless of the viewing angle selected by said operator.

2. Apparatus as defined in claim 1 wherein the support comprises a mirror housing.

3. Apparatus as defined in claim 2 wherein said programmer means is carried within said housing.

4. Apparatus as defined in claim 1 wherein said mirror is manually adjustable by the operator without the assistance of motorized power means.

5. Apparatus as defined in claim 3 wherein said programmer means comprises a cam and a cam follower which is moved along said cam by normal operator adjustment of said viewing angle.

6. An automotive outside rearview mirror apparatus as defined in claim 1 wherein the viewing field of the mirror in the operator-selected viewing angle overlaps the viewing field in the viewing angle selected by said programmer means.

7. Apparatus as defined in claim 6 wherein each of the viewing fields is defined by opposite boundary rays, the outside boundary ray of the operator-selected viewing field being essentially parallel to the inside boundary ray of the viewing field selected by said programmer means.

8. Apparatus as defined in claim 1 further including means for automatically returning said mirror to said selected position after said mirror has occupied said greater viewing angle for a brief period of time.

9. Apparatus as defined in claim 5 wherein the programmer means includes can means fixed relative to the mirror support.

10. Apparatus as defined in claim 9 further including follower means attached to said mirror and operatively associated with said fixed cam means and said power means for varying to amount of shift.

11. An automotive outside rearview mirror apparatus comprising:
    a mirror support adapted to be mounted on the outside of an automotive vehicle;
    a flat mirror mounted on said support and operator-adjustable about a substantially vertical axis to any of a plurality of starting positions according to the position and preference of the operator of the vehicle;
    operator-actuable power means for temporarily shifting mirror about said vertical axis to a target position in which at least part of the viewing field is more outboard of the vehicle than the viewing field selected by the operator in the starting position; and programmer means responsive to the particular starting position selected by the operator to vary the target position whereby the viewing angle achieved by actuation of said power means is contiguous to the operator-selected viewing field.

12. Apparatus as defined in claim 11 wherein the outboard boundary of the viewing field in the starting position overlaps and is essentially parallel to the inboard boundary of the viewing field in the target position.

13. Apparatus as defined in claim 16 wherein the programmer means includes cam means fixes relative to the mirror support.

14. Apparatus as defined in claim 13 including follower means attached to said mirror and operatively associated with said fixed cam means and said power means for varying the amount of said shift.

* * * * *

UNITED STATES PATENT AND TRADEMARK OFFICE
CERTIFICATE OF CORRECTION

PATENT NO. : 4,834,522

DATED : May 30, 1989

INVENTOR(S) : Janowicz

It is certified that error appears in the above-identified patent and that said Letters Patent is hereby corrected as shown below:

Column 4, line 61, "of the vehicle" should be --of said vehicle--.

Column 4, line 64, "said Vertical axis" should be --said axis--.

Signed and Sealed this

Second Day of April, 1991

Attest:

HARRY F. MANBECK, JR.

Attesting Officer

Commissioner of Patents and Trademarks